(12) United States Patent
Nakamura et al.

(10) Patent No.: US 7,460,312 B2
(45) Date of Patent: Dec. 2, 2008

(54) ZOOM LENS SYSTEM

(75) Inventors: Toshiki Nakamura, Saitama (JP); Takayuki Ito, Saitama (JP)

(73) Assignee: Hoya Corporation, Tokyo (JP)

( * ) Notice: Subject to any disclaimer, the term of this patent is extended or adjusted under 35 U.S.C. 154(b) by 0 days.

(21) Appl. No.: 11/467,700

(22) Filed: Aug. 28, 2006

(65) Prior Publication Data
US 2007/0047097 A1    Mar. 1, 2007

(30) Foreign Application Priority Data
Aug. 30, 2005    (JP)    ............ P2005-250024

(51) Int. Cl.
*G02B 15/14* (2006.01)
(52) U.S. Cl. .................. 359/689; 359/680
(58) Field of Classification Search .......... 359/676, 359/680, 686, 689
See application file for complete search history.

(56) References Cited

U.S. PATENT DOCUMENTS

| | | | |
|---|---|---|---|
| 6,308,011 B1 | 10/2001 | Wachi et al. | |
| 6,757,108 B2 | 6/2004 | Sensui et al. | |
| 6,844,986 B2 | 1/2005 | Nanba | |
| 6,925,253 B2 * | 8/2005 | Miyatake | ............ 396/79 |
| 2006/0221463 A1 | 10/2006 | Enomoto | |

FOREIGN PATENT DOCUMENTS

| | | |
|---|---|---|
| JP | 2000-111798 | 4/2000 |
| JP | 2002-139671 | 5/2002 |
| JP | 2003-131133 | 5/2003 |

OTHER PUBLICATIONS

English Language Abstract of JP 2000-111798.
English Language Abstract of JP 2002-139671.
English Language Abstract of JP 2003-131133.

* cited by examiner

*Primary Examiner*—Darryl J Collins
(74) *Attorney, Agent, or Firm*—Greenblum & Bernstein, P.L.C.

(57) ABSTRACT

A zoom lens system includes a negative first lens group, a positive second lens group, and a positive third lens group functioning as a focusing lens group, in this order from the object.

Upon zooming from the short focal length extremity to the long focal length extremity, the distance between the negative first lens group and the positive second lens group decreases, and the distance between the positive second lens group and the positive third lens group increases.

The positive third lens group includes cemented lens elements having a positive lens element and a negative lens element.

The zoom lens system satisfies the following condition:

$$0.2 < f_{3-p}/f_{3-n} < 0.35 \quad (1)$$

wherein $f_{3-p}$ designates the focal length of the positive lens element of the positive third lens group; and $f_{3-n}$ designates the focal length of the negative lens element of the positive third lens group.

3 Claims, 13 Drawing Sheets

Fig.1
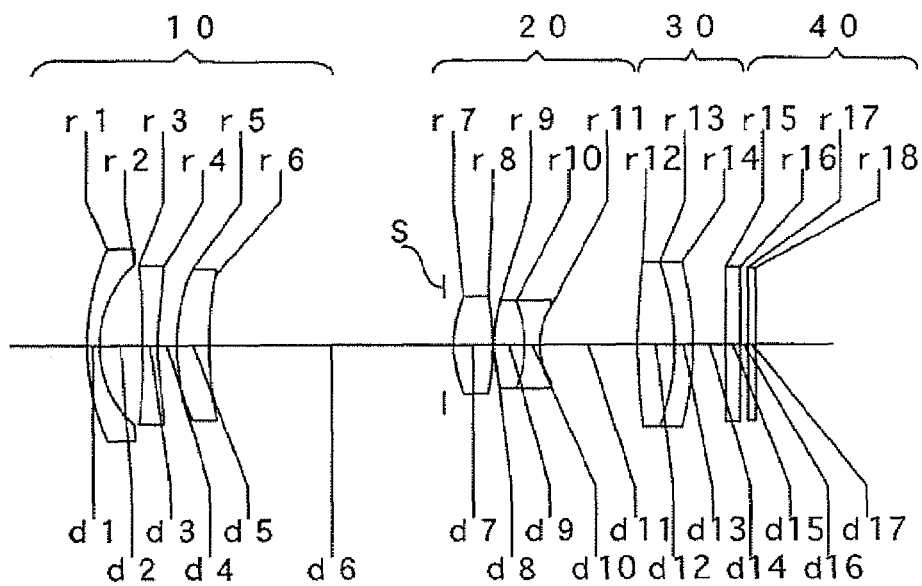
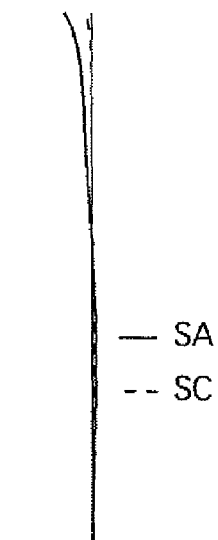
Fig.2A
F=1:2.9
— SA
-- SC
SPHERICAL
ABERRATION
THE SINE
CONDITION
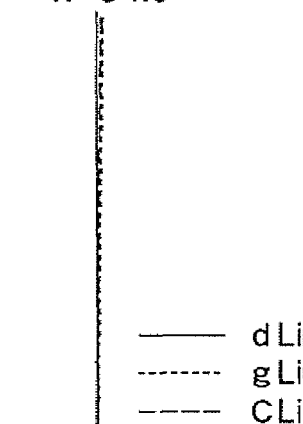
Fig.2B
W=34.0°
——— d Line
------- g Line
----- C Line
LATERAL
CHROMATIC
ABERRATION
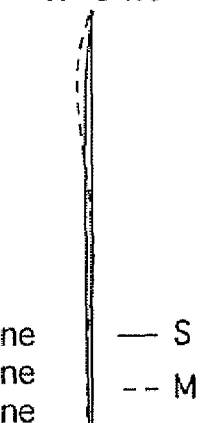
Fig.2C
W=34.0°
— S
-- M
ASTIGMATISM
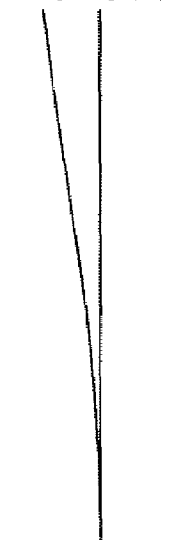
Fig.2D
W=34.0°
DISTORTION

F=1:3.7

— SA
-- SC

-0.1  0.1
SPHERICAL
ABERRATION

THE SINE
CONDITION

W=21.2°

—— d Line
······ g Line
---- C Line

-0.05  0.05
LATERAL
CHROMATIC
ABERRATION

W=21.2°

— S
-- M

-0.2  0.2
ASTIGMATISM

W=21.2°

-5 (%) 5
DISTORTION

F=1:5.2

— SA
-- SC

-0.1  0.1
SPHERICAL
ABERRATION

THE SINE
CONDITION

W=12.7°

—— d Line
······ g Line
---- C Line

-0.05  0.05
LATERAL
CHROMATIC
ABERRATION

W=12.7°

— S
-- M

-0.2  0.2
ASTIGMATISM

W=12.7°

-5 (%) 5
DISTORTION

Fig.5
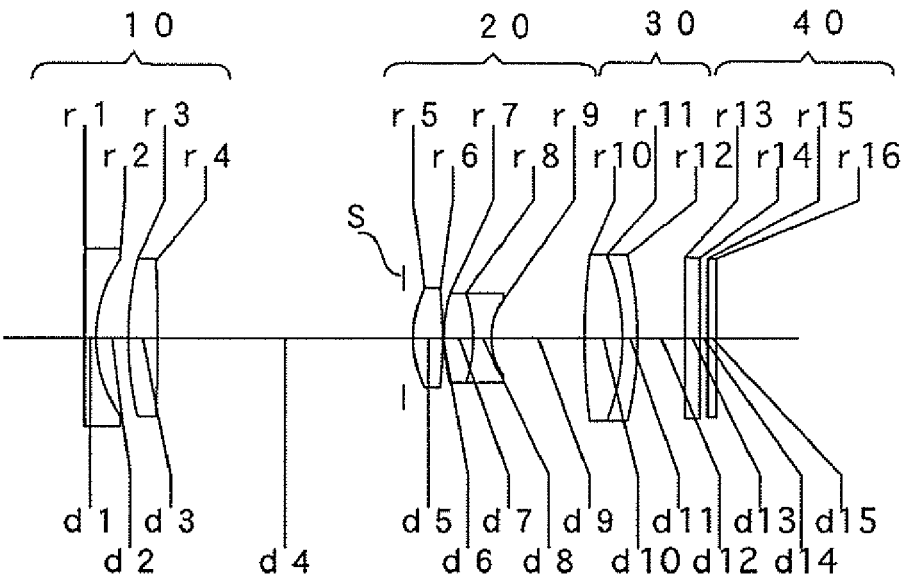
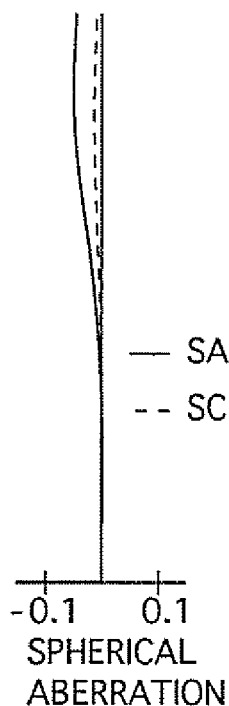
Fig.6A
F=1:2.9
-0.1  0.1
SPHERICAL
ABERRATION
THE SINE
CONDITION
— SA
-- SC
Fig.6B
W=31.9°
-0.05  0.05
LATERAL
CHROMATIC
ABERRATION
— d Line
---- g Line
--- C Line
Fig.6C
W=31.9°
-0.2  0.2
ASTIGMATISM
— S
-- M
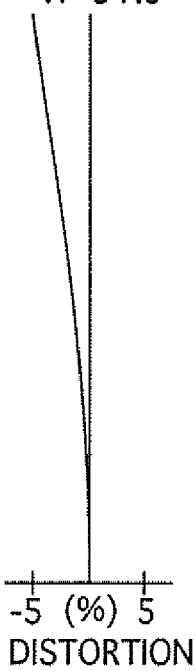
Fig.6D
W=31.9°
-5 (%) 5
DISTORTION

F=1:3.8

— SA
-- SC

-0.1  0.1
SPHERICAL
ABERRATION

THE SINE
CONDITION

W=19.3°

—— d Line
------ g Line
---- C Line

-0.05  0.05
LATERAL
CHROMATIC
ABERRATION

W=19.3°

— S
-- M

-0.2  0.2
ASTIGMATISM

W=19.3°

-5 (%) 5
DISTORTION

F=1:5.4

— SA
-- SC

-0.1  0.1
SPHERICAL
ABERRATION

THE SINE
CONDITION

W=11.7°

—— d Line
------ g Line
---- C Line

-0.05  0.05
LATERAL
CHROMATIC
ABERRATION

W=11.7°

— S
-- M

-0.2  0.2
ASTIGMATISM

W=11.7°

-5 (%) 5
DISTORTION

Fig.9
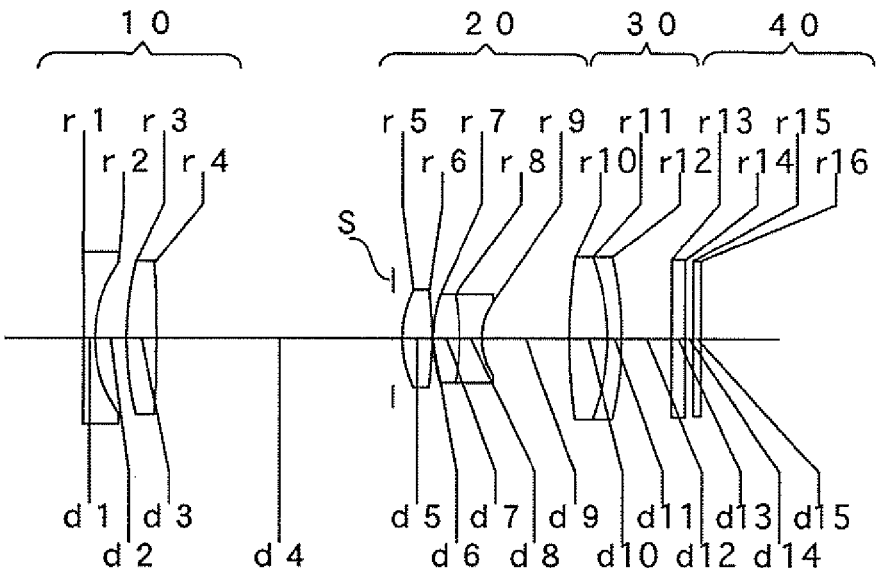
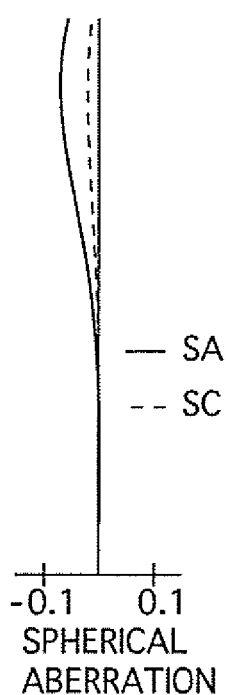
Fig.10A
F=1:2.9
SPHERICAL ABERRATION
THE SINE CONDITION
— SA
-- SC
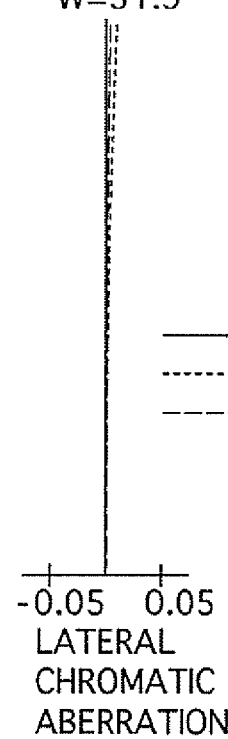
Fig.10B
W=31.9°
LATERAL CHROMATIC ABERRATION
—— d Line
······ g Line
---- C Line
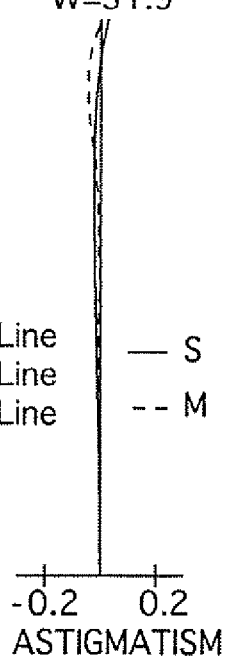
Fig.10C
W=31.9°
ASTIGMATISM
— S
-- M
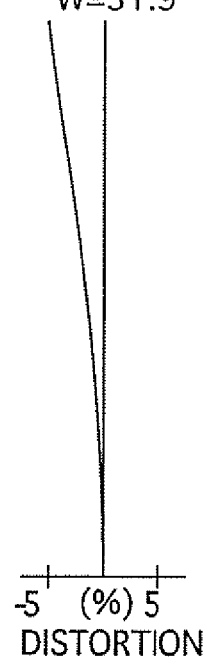
Fig.10D
W=31.9°
DISTORTION

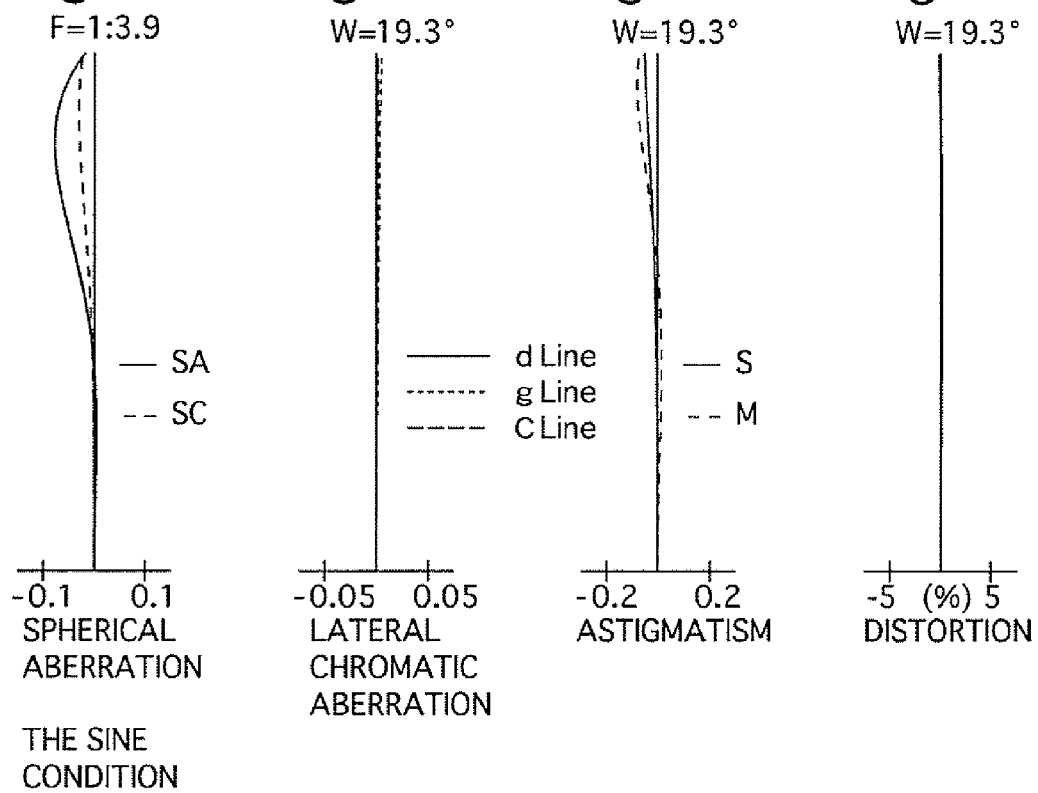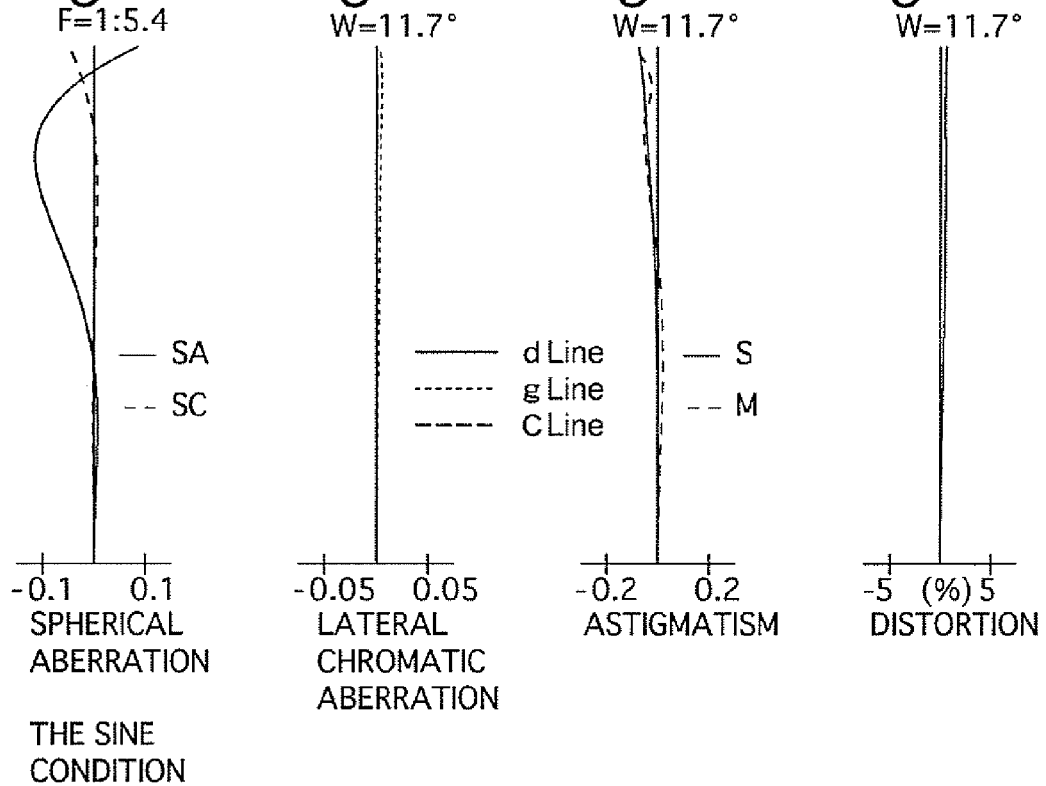

Fig. 13
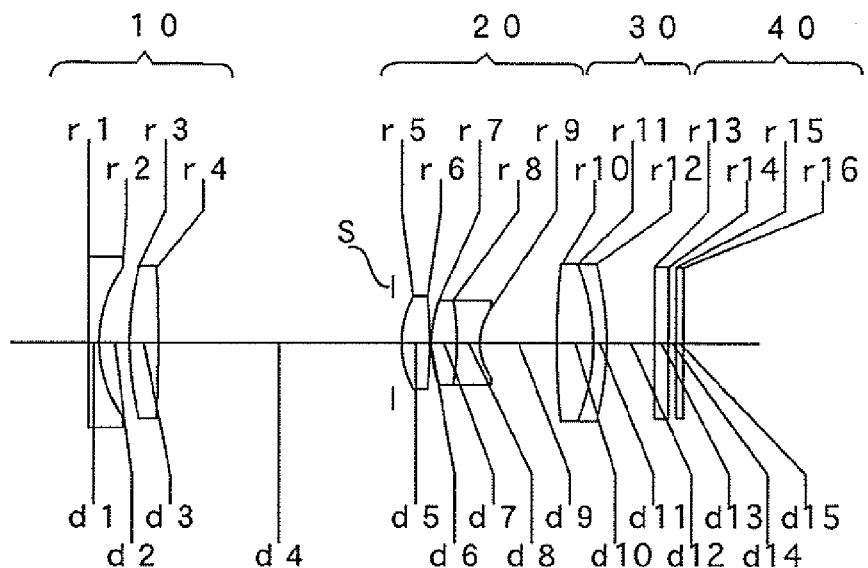
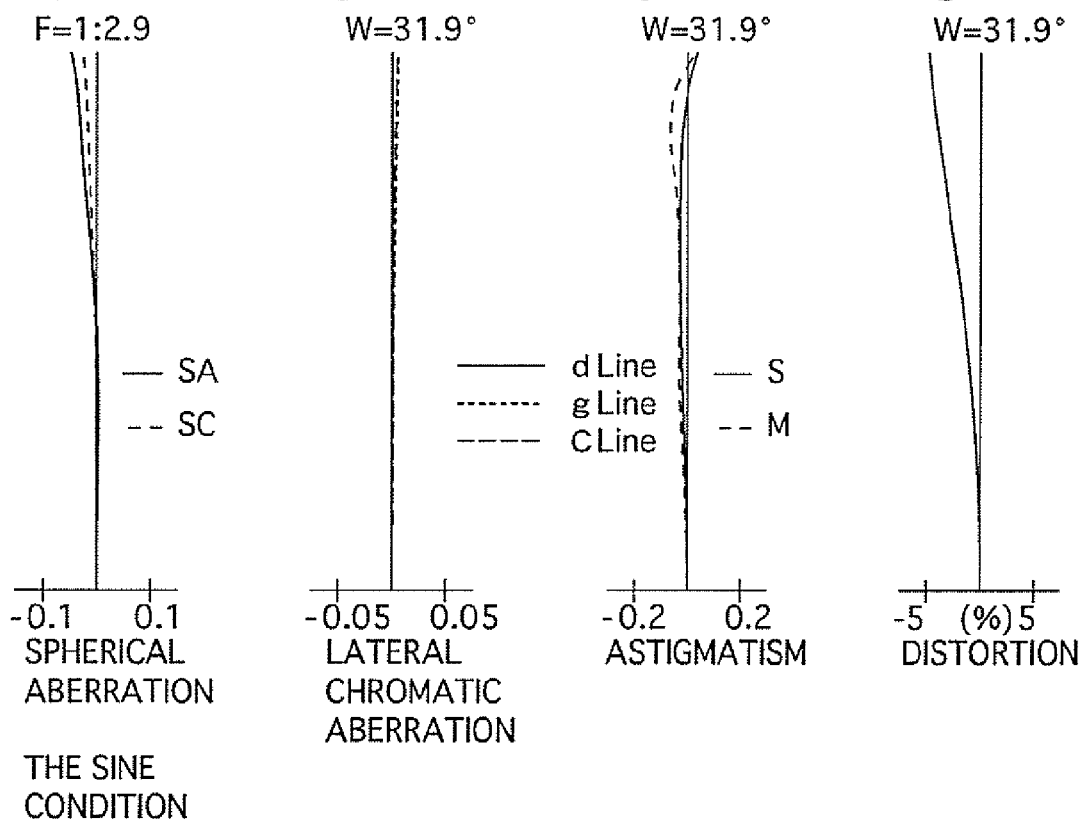
Fig.14A  Fig.14B  Fig.14C  Fig.14D
F=1:2.9  W=31.9°  W=31.9°  W=31.9°
— SA
-- SC
— d Line
···· g Line
--- C Line
— S
-- M
-0.1  0.1
SPHERICAL
ABERRATION
THE SINE
CONDITION
-0.05  0.05
LATERAL
CHROMATIC
ABERRATION
-0.2  0.2
ASTIGMATISM
-5 (%) 5
DISTORTION

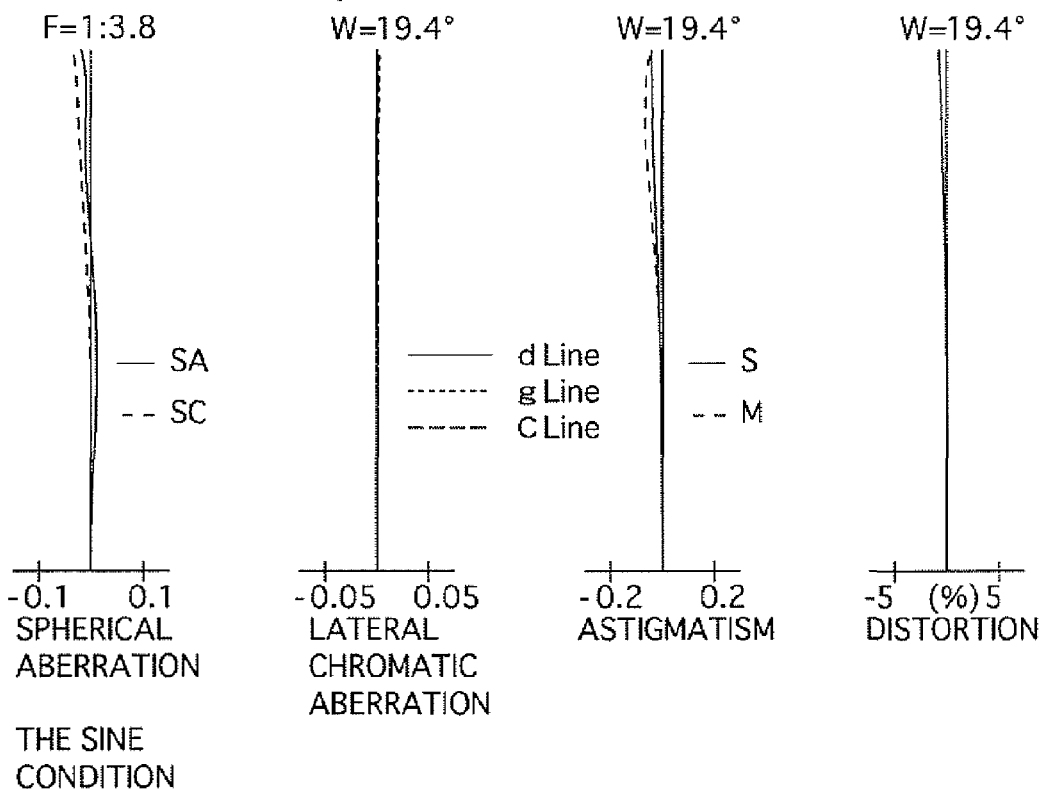
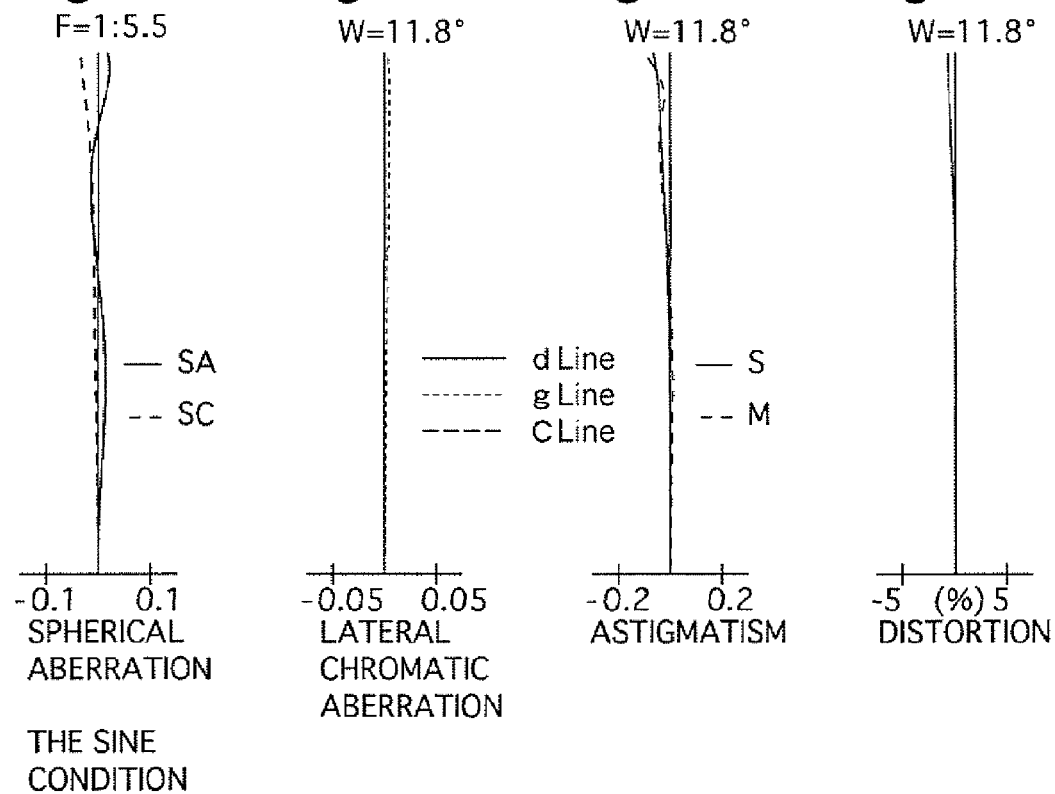

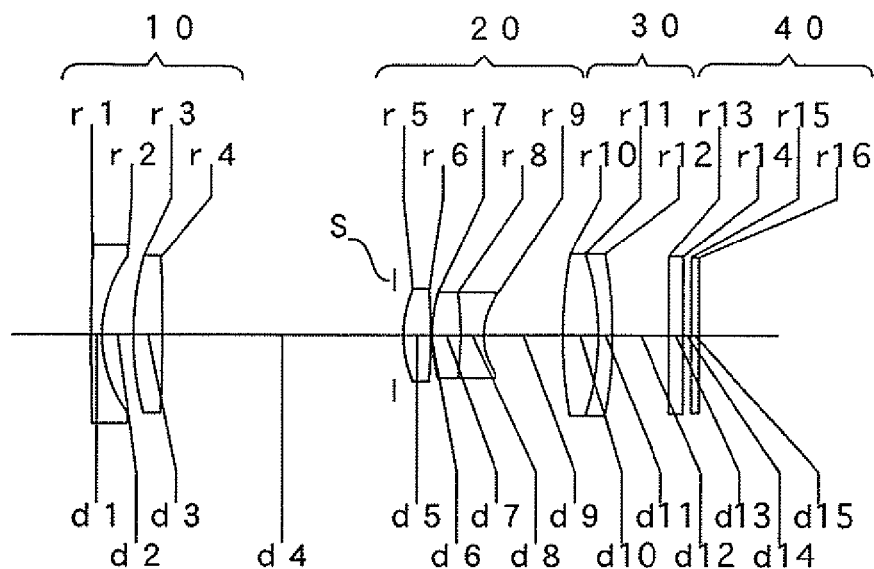
Fig.17
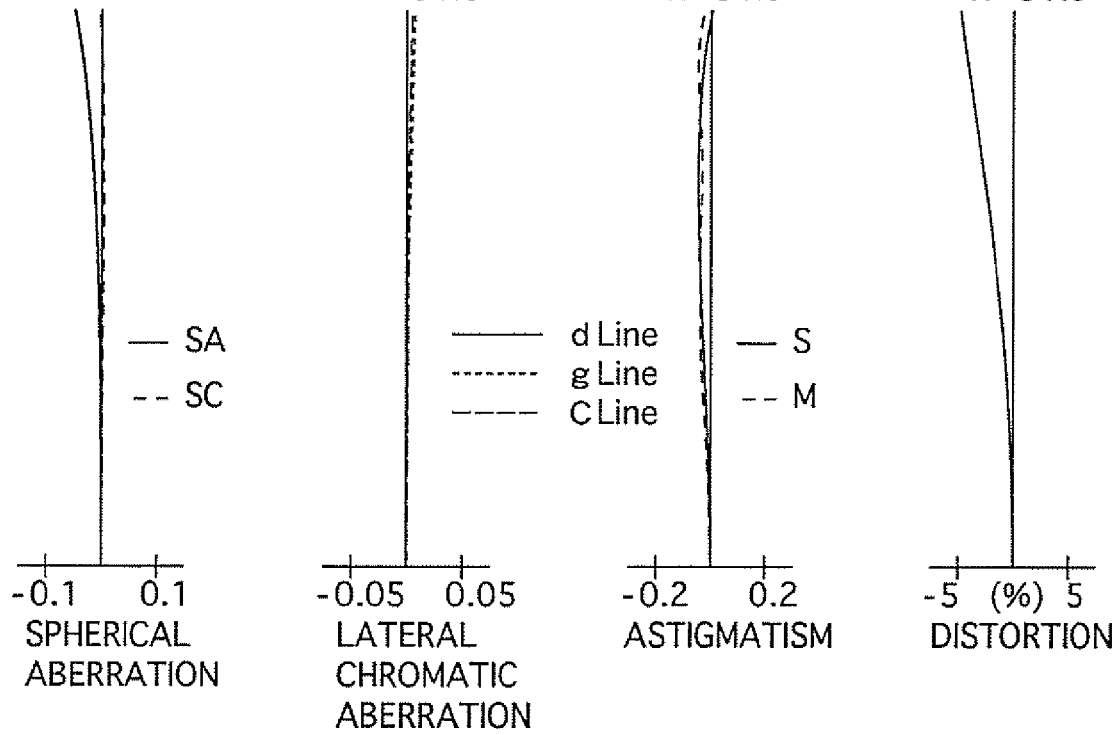
Fig.18A F=1:2.9
Fig.18B W=31.9°
Fig.18C W=31.9°
Fig.18D W=31.9°
— SA
-- SC
—— d Line
······ g Line
---- C Line
— S
-- M
-0.1  0.1
SPHERICAL
ABERRATION
THE SINE
CONDITION
-0.05  0.05
LATERAL
CHROMATIC
ABERRATION
-0.2  0.2
ASTIGMATISM
-5 (%) 5
DISTORTION

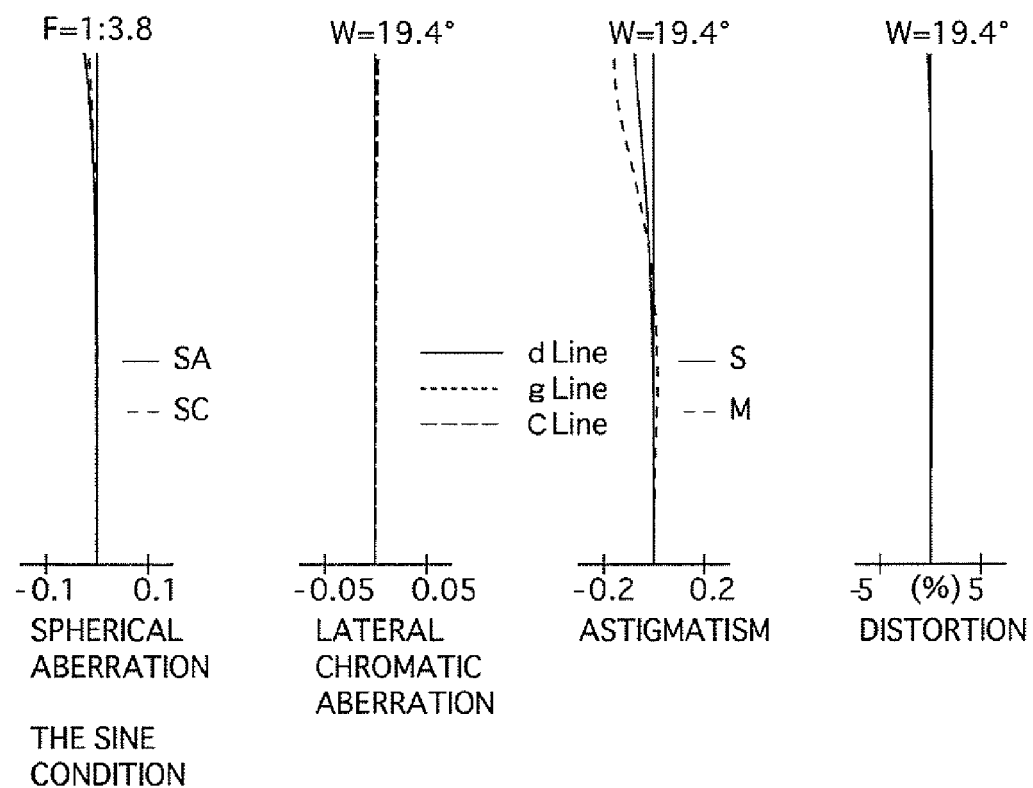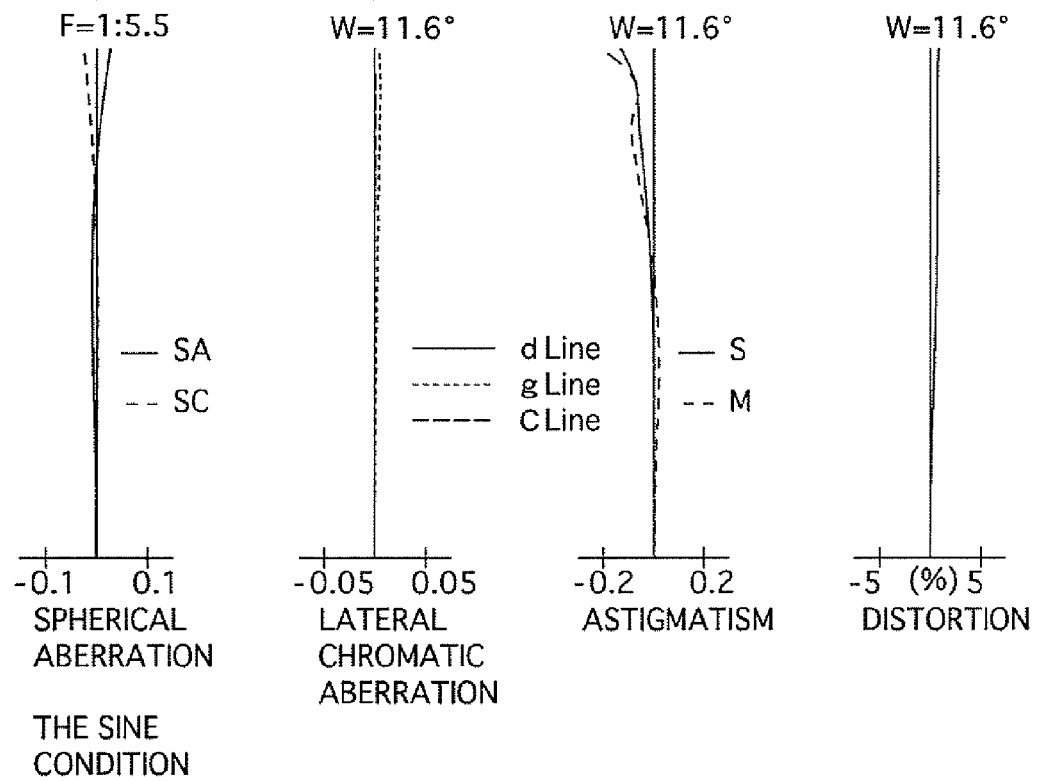

Fig. 21
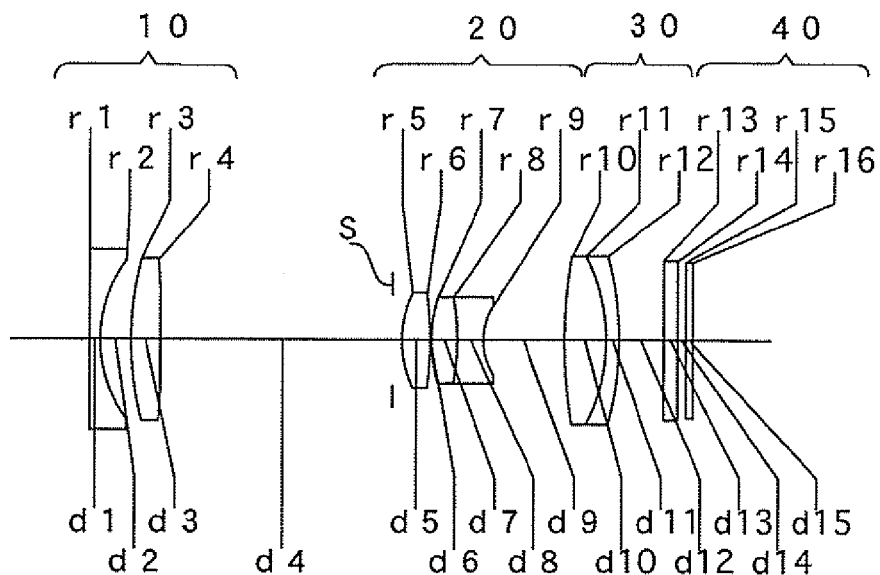
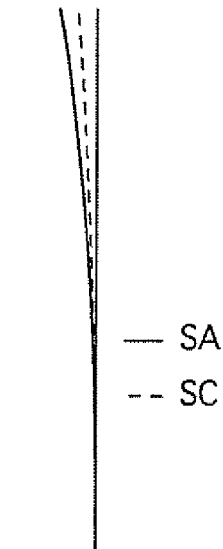
Fig. 22A
F=1:2.9
— SA
-- SC
-0.1  0.1
SPHERICAL
ABERRATION
THE SINE
CONDITION
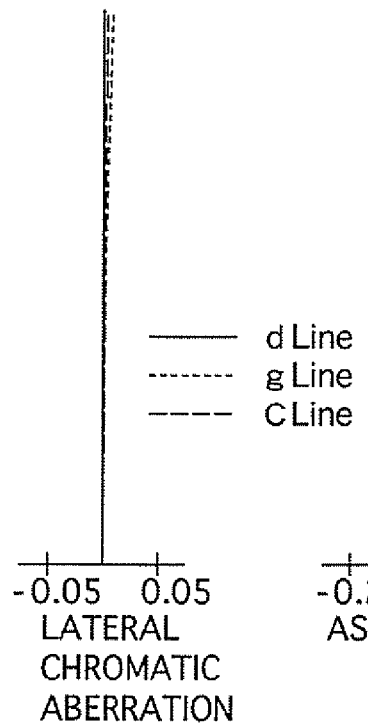
Fig. 22B
W=31.1°
——— d Line
------- g Line
- - - - C Line
-0.05  0.05
LATERAL
CHROMATIC
ABERRATION
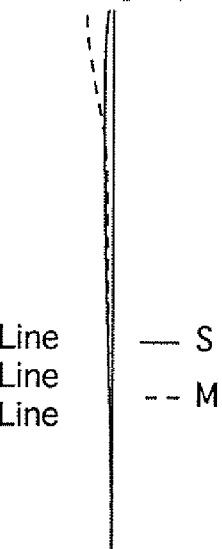
Fig. 22C
W=31.1°
— S
-- M
-0.2  0.2
ASTIGMATISM
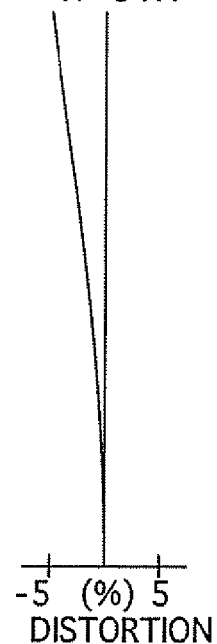
Fig. 22D
W=31.1°
-5 (%) 5
DISTORTION

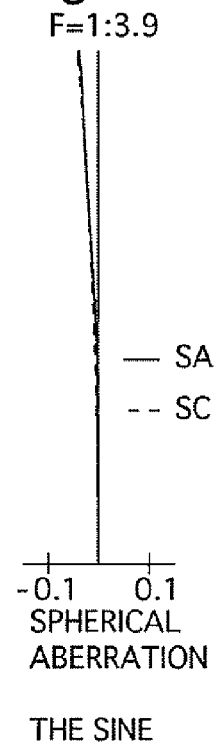
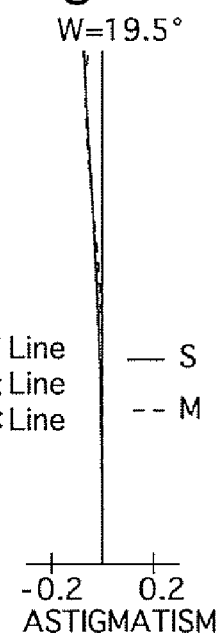
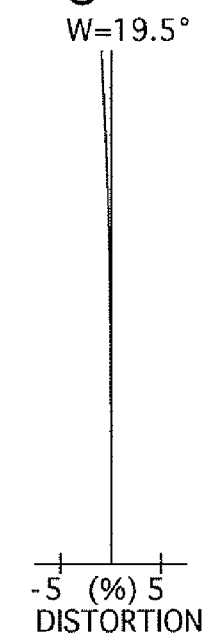
Fig.23A F=1:3.9 — SPHERICAL ABERRATION THE SINE CONDITION
Fig.23B W=19.5° — LATERAL CHROMATIC ABERRATION
Fig.23C W=19.5° — ASTIGMATISM
Fig.23D W=19.5° — DISTORTION
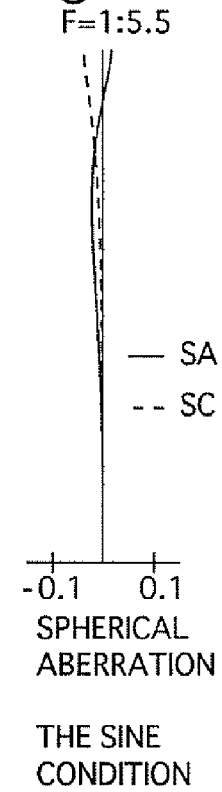
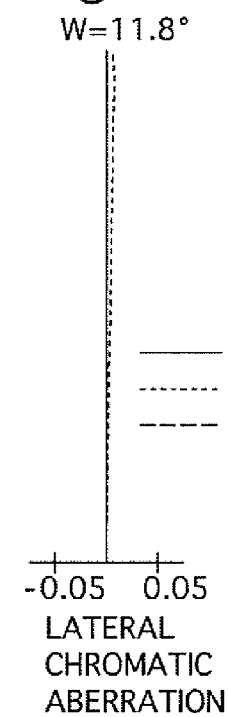
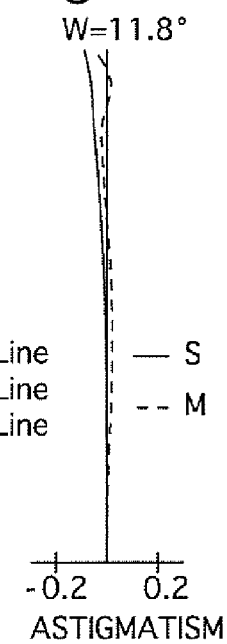
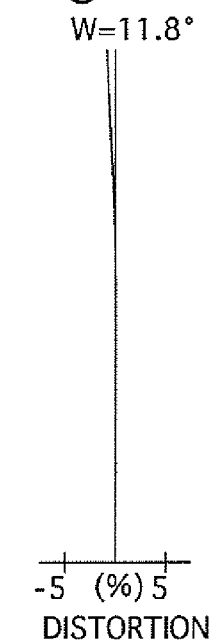
Fig.24A F=1:5.5 — SPHERICAL ABERRATION THE SINE CONDITION
Fig.24B W=11.8° — LATERAL CHROMATIC ABERRATION
Fig.24C W=11.8° — ASTIGMATISM
Fig.24D W=11.8° — DISTORTION

ZOOM LENS SYSTEM

BACKGROUND OF THE INVENTION

1. Field of the Invention

The present invention relates to a zoom lens system having a zoom ratio of approximately 3, which is suitable for a digital camera.

2. Description of the Prior Art

Zoom lens systems for a digital camera with 3 to 5 megapixels, e.g., disclosed in Japanese Unexamined Patent Publication (JUPP) No. 2000-111798, JUPP No. 2002-139671, and JUPP No. 2003-131133, have been known in the art.

However, in the case where an attempt is made to utilize these zoom lens systems in high-definition digital cameras with 8 megapixels or more, these zoom lens systems are insufficient in the correcting of aberrations, in particular, the correcting of lateral chromatic aberration. Moreover, the overall length of each of these zoom lens systems is long, and miniaturization thereof cannot be attained.

The present invention is to provide a zoom lens system with a zoom ratio of approximately 3 at the short focal length extremity, and with a half angle-of-view of 32° to 34° thereat. The present invention, in particular, is to provide a zoom lens system which attains high definition while lateral chromatic aberration is adequately corrected. Further, the present invention is to provide a zoom lens system in which the thickness of lens groups can be made ultra-slim (miniaturized).

SUMMARY OF THE INVENTION

According to an aspect of the present invention, there is provided a zoom lens system including a first lens group having a negative refractive power (hereinafter, a negative first lens group), a second lens group having a positive refracting power (hereinafter, a positive second lens group) and a third lens group having a positive refractive power (hereinafter, a positive third lens group) and functioning as a focusing lens group, in this order from the object.

Upon zooming from the short focal length extremity to the long focal length extremity, the distance between the negative first lens group and the positive second lens group decreases, and the distance between the positive second lens group and the positive third lens group increases.

The positive third lens group includes cemented lens elements having a positive lens element and a negative lens element.

The zoom lens system satisfies the following condition:

$$0.2 < f_{3-p}/|f_{3-n}| < 0.35 \quad (1)$$

wherein $f_{3-p}$ designates the focal length of the positive lens element of the positive third lens group; and $f_{3-n}$ designates the focal length of the negative lens element of the positive third lens group.

The zoom lens system preferably satisfies the following condition:

$$0.0 \leq \log(Z_3)/\log(Z) < 0.2 \quad (2)$$

wherein $Z_3$ designates a zoom ratio of the positive third lens group; and $Z$ designates a zoom ratio of the entire the zoom lens system.

The zoom lens system preferably satisfies the following conditions:

$$0.65 < (f_W \times f_T)^{1/2}/|f_{1G}| < 1.1 \quad (3)$$

$$0.2 < f_W/f_{3G} < 0.5 \quad (4)$$

wherein $f_W$ designates the focal length of the entire the zoom lens system at the short focal length extremity;

$f_T$ designates the focal length of the entire the zoom lens system at the long focal length extremity;

$f_{1G}$ designates the focal length of the negative first lens group; and $f_{3G}$ designates the focal length of the positive third lens group.

In the positive third lens group, the positive lens element and the negative lens element are preferably arranged in this order from the object.

The present disclosure relates to subject matter contained in Japanese Patent Application No. 2005-250024 (filed on Aug. 30, 2005) which is expressly incorporated herein in its entirety.

BRIEF DESCRIPTION OF THE DRAWINGS

The present invention will be discussed below in detail with reference to the accompanying drawings, in which:

FIG. 1 is a lens arrangement of the zoom lens system, at the short focal length extremity, according to a first embodiment of the present invention;

FIGS. 2A, 2B, 2C and 2D show aberrations occurred, at the short focal length extremity, in the lens arrangement shown in FIG. 1;

FIG. 5 is a lens arrangement of the zoom lens system, at the short focal length extremity, according to a second embodiment of the present invention;

FIGS. 6A, 6B, 6C and 6D show aberrations occurred, at the short focal length extremity, in the lens arrangement shown in FIG. 5;

FIG. 9 is a lens arrangement of the zoom lens system, at the short focal length extremity, according to a third embodiment of the present invention;

FIGS. 10A, 10B, 10C and 10D show aberrations occurred, at the short focal length extremity, in the lens arrangement shown in FIG. 9;

FIGS. 11A, 11B, 11C and 11D show aberrations occurred, at an intermediate focal length, in the lens arrangement shown in FIG. 9;

FIGS. 12A, 12B, 12C and 12D show aberrations occurred, at the long focal length extremity, in the lens arrangement shown in FIG. 9;

FIG. 13 is a lens arrangement of the zoom lens system, at the short focal length extremity, according to a fourth embodiment of the present invention;

FIGS. 14A, 14B, 14C and 14D show aberrations occurred, at the short focal length extremity, in the lens arrangement shown in FIG. 13;

FIGS. 15A, 15B, 15C and 15D show aberrations occurred, at an intermediate focal length, in the lens arrangement shown in FIG. 13;

FIGS. 16A, 16B, 16C and 16D show aberrations occurred, at the long focal length extremity, in the lens arrangement shown in FIG. 13;

FIG. 17 is a lens arrangement of the zoom lens system, at the short focal length extremity, according to a fifth embodiment of the present invention;

FIGS. 18A, 18B, 18C and 18D show aberrations occurred, at the short focal length extremity, in the lens arrangement shown in FIG. 17;

FIGS. 19A, 19B, 19C and 19D show aberrations occurred, at an intermediate focal length, in the lens arrangement shown in FIG. 17;

FIGS. 20A, 20B, 20C and 20D show aberrations occurred, at the long focal length extremity, in the lens arrangement shown in FIG. 17;

FIG. 21 is a lens arrangement of the zoom lens system, at the short focal length extremity, according to a sixth embodiment of the present invention;

FIGS. 22A, 22B, 22C and 22D show aberrations occurred, at the short focal length extremity, in the lens arrangement shown in FIG. 21;

FIGS. 23A, 23B, 23C and 23D show aberrations occurred, at an intermediate focal length, in the lens arrangement shown in FIG. 21;

FIGS. 24A, 24B, 24C and 24D show aberrations occurred, at the long focal length extremity, in the lens arrangement shown in FIG. 21.

DESCRIPTION OF THE PREFERRED EMBODIMENTS

Figure 3A:
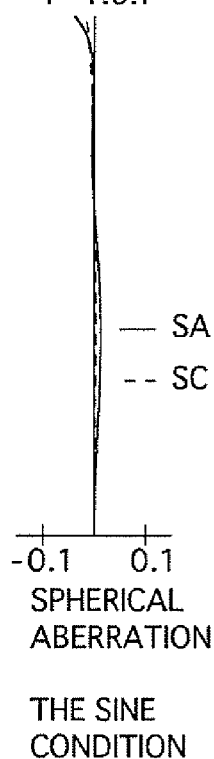
FIGS. 3A, 3B, 3C and 3D show aberrations occurred, at an intermediate focal length, in the lens arrangement shown in FIG. 1.
Figure 3B:
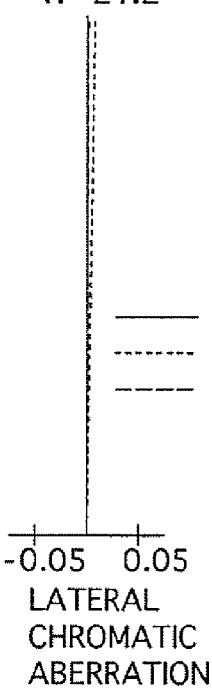
Figure 3C:
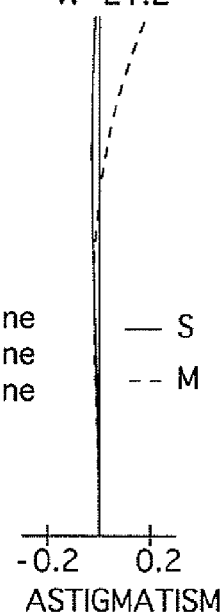
Figure 3D:
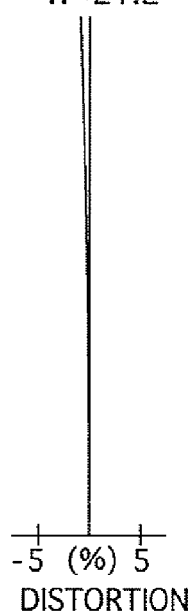
Figure 4A:
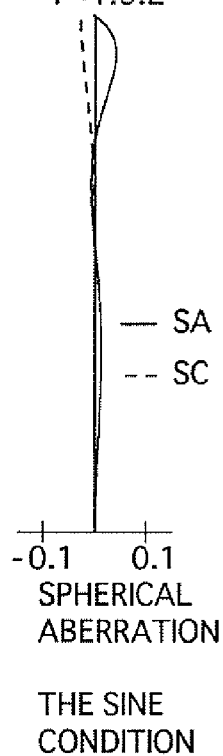
FIGS. 4A, 4B, 4C and 4D show aberrations occurred, at the long focal length extremity, in the lens arrangement shown in FIG. 1.
Figure 4B:
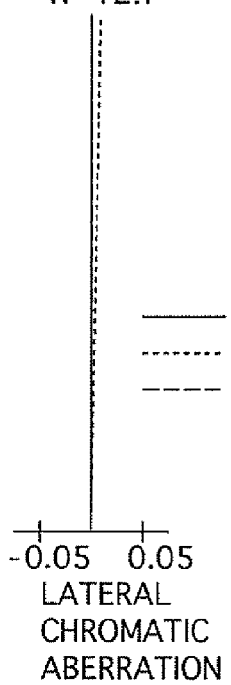
Figure 4C:
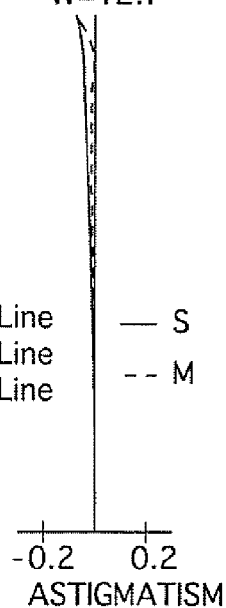
Figure 4D:
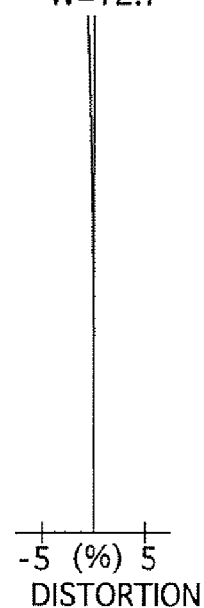
Figure 7A:
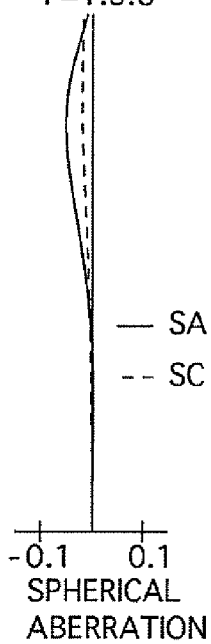
FIGS. 7A, 7B, 7C and 7D show aberrations occurred, at an intermediate focal length, in the lens arrangement shown in FIG. 5.
Figure 7B:
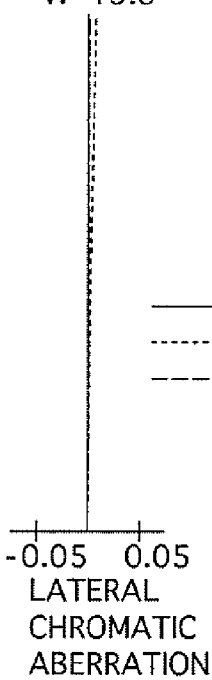
Figure 7C:
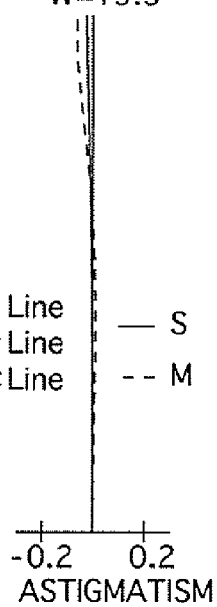
Figure 7D:
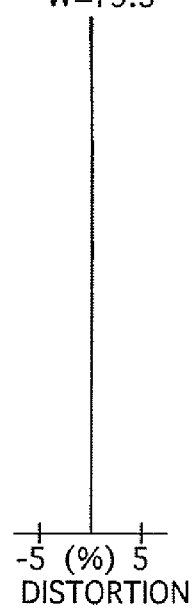
Figure 8A:
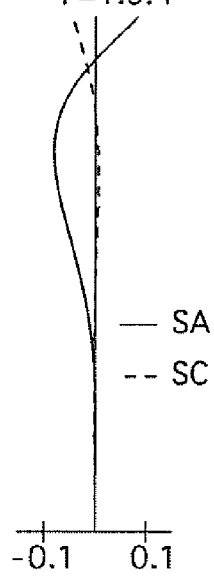
FIGS. 8A, 8B, 8C and 8D show aberrations occurred, at the long focal length extremity, in the lens arrangement shown in FIG. 5.
Figure 8B:
Figure 8C:
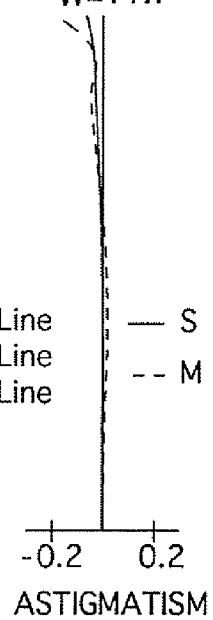
Figure 8D:
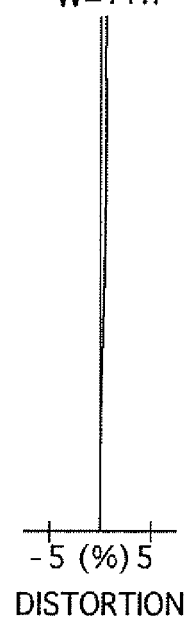
Figure 25:
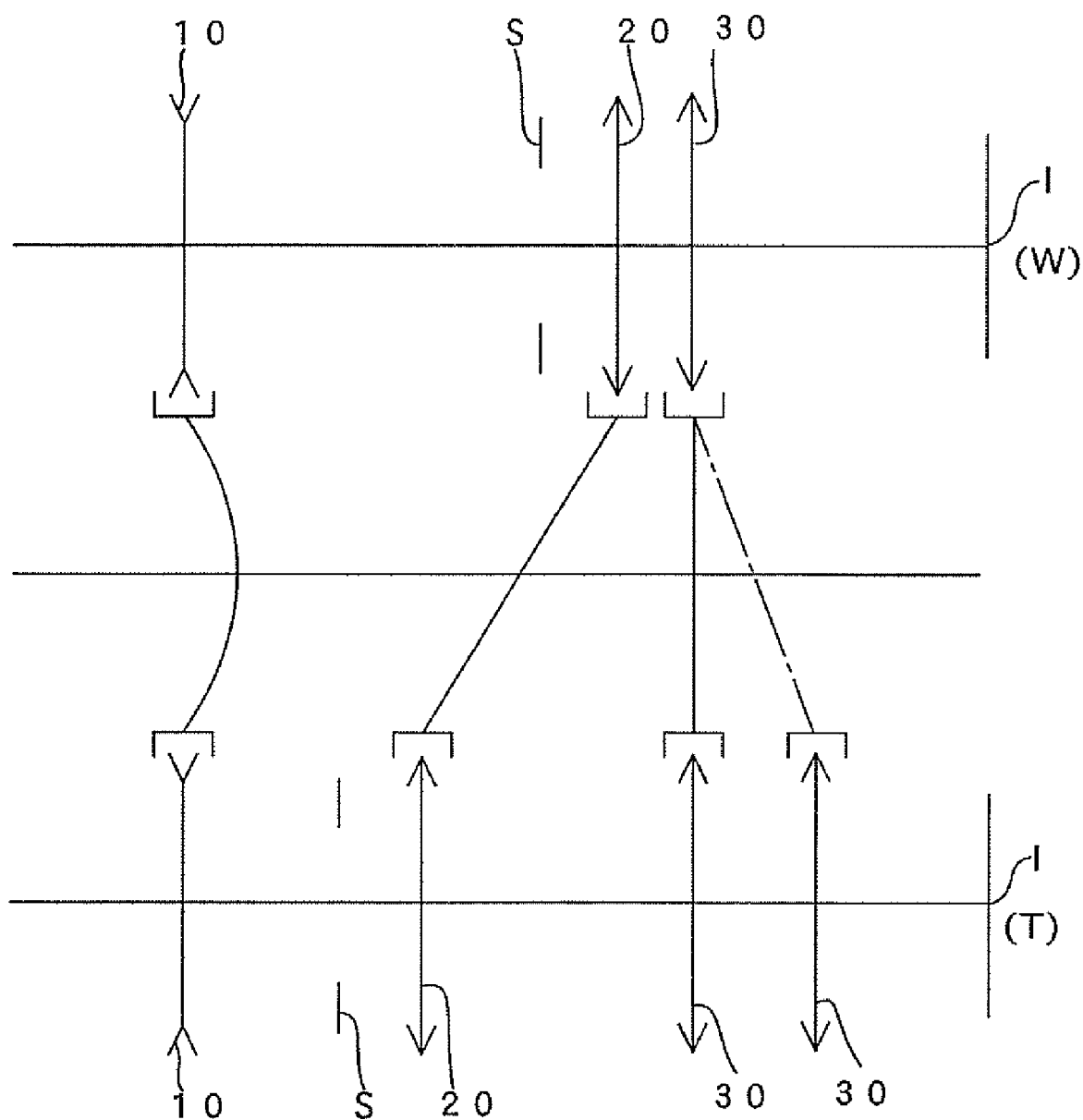
FIG. 25 is the schematic view of the lens-group moving paths of the zoom lens system according to the present invention.

FIG. 25 is the schematic view of the lens-group moving paths of the zoom lens system according to the present invention.

The zoom lens system, as shown in FIG. 25, includes a negative first lens group 10, a diaphragm S, a positive second lens group 20, and a positive third lens group 30, in this order from the object. A filter group (plane-parallel plate) 40 is provided on the image-side of the positive third lens group 30, and in front of the imaging-forming plane (I) of a solid-state image pick-up device.

Upon zooming from the short focal length extremity (W) to the long focal length extremity (T), the negative first lens group 10 first moves toward the image and thereafter and moves toward the object; the positive second lens group 20 monotonically moves toward the object; and the positive third lens group 30 either remains stationary with respect to the imaging-forming plane (I), as shown by the solid line, or monotonically moves rearward toward the image, as shown by the chain line.

Moving the positive third lens group 30 toward the image-forming plane (I) allows further miniaturization (thinner lens system) than remaining the positive third lens group 30 stationary.

The diaphragm S moves together with the positive second lens group 20.

Focusing is carried out by the positive third lens group 30.

A main feature of the present invention is to suitably correct aberrations, particularly lateral chromatic aberration, by constituting the positive third lens group 30 as cemented lens elements having a positive lens element and a negative lens element both of which satisfies condition (1).

If $f_{3-p}/|f_{3-n}|$ exceeds the upper limit of condition (1) the refractive power of the negative lens element of the positive third lens group 30 becomes stronger, so that lateral chromatic aberration is overcorrected.

If $f_{3-p}/|f_{3-n}|$ exceeds the lower limit of condition (1) lateral chromatic aberration is undercorrected.

Condition (2) concerns the zoom ratio of the positive third lens group 30, i.e., specifies how much the positive third lens group 30 contributes to zooming in the zoom lens system.

Upon zooming from the short focal length extremity (W) to the long focal length extremity (T), if an attempt is made to move the positive third lens group 30 toward the image, the positive third lens group 30 substantially contributes to changing magnification in zooming. Consequently, the traveling distance of the positive second lens group 20 can be made shorter; thereby, it is advantageous for the zoom lens system to be miniaturized.

If $\log(Z_3)/\log(Z)$ exceeds the upper limit of condition (2), the traveling distance of the positive third lens group 30 becomes longer, and the positive third lens group 30 too closely approaches the image-forming plane (I) of the solid-state image pick-up device. Consequently, it becomes difficult to secure a sufficient back focal distance for positioning the filter group 40.

If $\log(Z_3)/\log(Z)$ exceeds the lower limit of condition (2), i.e., less than zero, the positive third lens group 30 no longer contributes to an increase of a magnification in zooming, rather, the positive third lens group 30 is arranged to decrease a magnification. Consequently, the traveling distance of the positive second lens group 20 becomes longer, so that the overall length of the zoom lens system becomes longer.

Not contributing to an increase of a magnification in zooming is because $\log(Z_3)/\log(Z)=0$ means that the positive third lens group 30 does not move in zooming, i.e., does not contribute to changing magnification in zooming. If an attempt is made to avoid the above, the zoom lens system preferably satisfies the following condition:

$$0.08 < \log(Z_3)/\log(Z) < 0.2 \qquad (2')$$

Condition (3) specifies the refractive power of the negative first lens group 10.

If $(f_W \times f_T)^{1/2}/|f_{1G}|$ exceeds the upper limit of condition (3), the refractive power of the negative first lens group 10 becomes too strong. Consequently, the overall length of the zoom lens system becomes too much longer at the long focal length extremity than at the short focal length extremity. Furthermore, the correcting of off-axis aberration such as distortion becomes difficult at the short focal length extremity.

If $(f_W \times f_T)^{1/2}/|f_{1G}|$ exceeds the lower limit of condition (3), the refractive power of the negative first lens group 10 becomes weaker, so that the correcting of aberrations can advantageously be made. However, the overall length of the zoom lens system at the short focal length extremity becomes longer. Consequently, attaining the ultra-slim thickness of the zoom lens system becomes difficult.

Condition (4) specifies the refractive power of the positive third lens group 30.

If $f_W/f_{3G}$ exceeds the upper limit of condition (4), the positive refractive power of the positive third lens group 30 becomes stronger, so that the combined refractive power of the negative first lens group 10 and the positive second lens group 20 becomes relatively weaker. Consequently, the traveling distance of the positive second lens group 20 becomes longer; thereby, fluctuation of astigmatism upon zooming and that of distortion increase.

If $f_W/f_{3G}$ exceeds the lower limit of condition (4), the positive refractive power of the positive third lens group 30 becomes weaker, so that astigmatism is undercorrected.

Specific numerical data of the embodiments will be described hereinafter.

In the diagrams of spherical aberration and the sine condition, SA designates spherical aberration, and SC designates the sine condition.

In the diagrams of lateral chromatic aberration, the two types of dotted lines respectively indicate magnification with respect to the g and C lines; however, the d line as the base line coincides with the ordinate.

In the diagrams of astigmatism, S designates the sagittal image, and M designates the meridional image.

The tables, FNO. designates the f-number, f designates the focal length of the entire fisheye zoom lens system, W designates the half angle-of-view (°), fB designates the back focal distance, r designates the radius of curvature, d designates the lens-element thickness or a distance between lens elements (lens groups) which is variable upon zooming, $N_d$ designates the refractive index of the d-line, and ν designates the Abbe number.

The values for the distance "d" are indicated in the order of the short focal length extremity, an intermediate focal length and the long focal length extremity.

In addition to the above, an aspherical surface which is symmetrical with respect to the optical axis is defined as follows:

$$x=cy^2/(1+[1-\{1+K\}c^2y^2]^{1/2})+A4y^4+A6y^6+A8y^8+A10y^{10}$$

wherein:

c designates a curvature of the aspherical vertex (1/r);
y designates a distance from the optical axis;
K designates the conic coefficient; and
A4 designates a fourth-order aspherical coefficient;
A6 designates a sixth-order aspherical coefficient;
A8 designates a eighth-order aspherical coefficient; and
A10 designates a tenth-order aspherical coefficient.

Embodiment 1

FIG. 1 is the lens arrangement of the zoom lens system, at the short focal length extremity, according to the first embodiment of the present invention. FIGS. 2A through 2D show aberrations occurred, at the short focal length extremity, in the lens arrangement shown in FIG. 1. FIGS. 3A through 3D show aberrations occurred, at an intermediate focal length, in the lens arrangement shown in FIG. 1. FIGS. 4A through 4D show aberrations occurred, at the long focal length extremity, in the lens arrangement shown in FIG. 1.

Table 1 shows the numerical data of the first embodiment.

The zoom lens system of the first embodiment includes a negative first lens group 10, a diaphragm S, a positive second lens group 20, and a positive third lens group 30, in this order from the object.

The positive third lens group 30 remains stationary during zooming.

The filter group (plane-parallel plate) 40 is provided on the image side of the positive third lens group 30, and in front of an imaging-forming plane (I) of a solid-state image pick-up device.

The negative first lens group 10 includes a negative meniscus lens element having the convex surface facing toward the object, a biconcave negative lens element, and a positive meniscus lens element having the convex surface facing toward the object, in this order from the object.

The positive second lens group 20 includes a biconvex positive lens element, and cemented lens elements having a biconvex positive lens element and a biconcave negative lens element, in this order from the object.

The positive third lens group 30 includes cemented lens elements having a biconvex positive lens element and a negative meniscus lens element having the convex surface facing toward the image, in this order from the object.

The diaphragm S is provided 0.60 in front of the positive second lens group 20 (surface No. 7).

TABLE 1

F = 1:2.9-3.7-5.2
f = 7.50-12.50-21.40
W = 34.0-21.2-12.7
fB = 0.59-0.59-0.59

| Surf. No. | r | d | Nd | ν |
|---|---|---|---|---|
| 1 | 15.000 | 0.80 | 1.88300 | 40.8 |
| 2 | 7.002 | 2.77 | — | — |
| 3 * | −872.134 | 1.00 | 1.69007 | 53.0 |
| 4 * | 17.275 | 1.19 | — | — |
| 5 * | 11.565 | 2.12 | 1.83291 | 24.1 |
| 6 * | 25.784 | 15.73-7.33-2.10 | — | — |
| 7 * | 7.087 | 2.59 | 1.61800 | 63.4 |
| 8 * | −16.228 | 0.10 | — | — |
| 9 | 10.944 | 1.97 | 1.80400 | 46.6 |
| 10 | −7.357 | 1.00 | 1.80100 | 35.0 |
| 11 | 4.328 | 6.32-11.15-19.76 | — | — |
| 12 * | 37.979 | 2.43 | 1.68800 | 55.8 |
| 13 | −15.040 | 1.17 | 1.84666 | 23.8 |
| 14 | −20.805 | 2.13 | — | — |
| 15 | ∞ | 0.90 | 1.51633 | 64.1 |
| 16 | ∞ | 0.51 | — | — |
| 17 | ∞ | 0.50 | 1.51633 | 64.1 |
| 18 | ∞ | — | — | — |

The symbol * designates the aspherical surface which is rotationally symmetrical with respect to the optical axis.

Aspherical surface data (the aspherical surface coefficients not indicated are zero (0.00)):

| Surf. No. | K | A4 | A6 | A8 |
|---|---|---|---|---|
| 3 | 0.00 | −0.31755 × 10$^{-3}$ | 0.20551 × 10$^{-5}$ | 0.13750 × 10$^{-6}$ |
| 4 | 0.00 | −0.63487 × 10$^{-3}$ | 0.15213 × 10$^{-4}$ | −0.38971 × 10$^{-6}$ |
| 5 | 0.00 | −0.21071 × 10$^{-3}$ | 0.11963 × 10$^{-4}$ | −0.20084 × 10$^{-6}$ |
| 6 | 0.00 | −0.44152 × 10$^{-4}$ | 0.84960 × 10$^{-5}$ | 0.60220 × 10$^{-7}$ |
| 7 | 0.00 | −0.54722 × 10$^{-3}$ | −0.31157 × 10$^{-5}$ | −0.12390 × 10$^{-5}$ |
| 8 | 0.00 | 0.82030 × 10$^{-4}$ | −0.76017 × 10$^{-5}$ | −0.92353 × 10$^{-6}$ |
| 12 | 0.00 | −0.13263 × 10$^{-5}$ | 0.25113 × 10$^{-6}$ | −0.16452 × 10$^{-8}$ |

| Surf. No. | A10 |
|---|---|
| 3 | −0.62718 × 10$^{-8}$ |
| 4 | −0.11173 × 10$^{-8}$ |

Embodiment 2

FIG. 5 is the lens arrangement of the zoom lens system, at the short focal length extremity, according to the second embodiment of the present invention. FIGS. 6A through 6D show aberrations occurred, at the short focal length extremity, in the lens arrangement shown in FIG. 5. FIGS. 7A through 7D show aberrations occurred, at an intermediate focal length, in the lens arrangement shown in FIG. 5. FIGS. 8A through 8D show aberrations occurred, at the long focal length extremity, in the lens arrangement shown in FIG. 5.

Table 2 shows the numerical data of the second embodiment.

The negative first lens group 10 includes a negative meniscus lens element having the convex surface facing toward the object, and a biconvex positive lens element, in this order from the object.

The positive second lens group 20 includes a biconvex positive lens element, and cemented lens elements having a biconvex positive lens element and a biconcave negative lens element, in this order from the object.

Upon zooming, the positive third lens group 30 moves toward the image.

The remaining lens arrangement of the second embodiment is the same as that of the first embodiment.

The diaphragm S is provided 0.60 in front of the positive second lens group 20 (surface No. 5).

TABLE 2

F = 1:2.9-3.8-5.4
f = 8.12-13.70-23.02
W = 31.9-19.3-11.7
fB = 0.59-0.59-0.59

| Surf. No. | r | d | Nd | ν |
|---|---|---|---|---|
| 1 | 1175.100 | 0.70 | 1.88300 | 40.8 |
| 2 | 8.271 | 2.00 | — | — |
| 3 * | 19.124 | 1.85 | 1.83291 | 24.1 |
| 4 * | −1033.468 | 15.66-7.45-2.52 | — | — |
| 5 * | 6.667 | 1.85 | 1.69007 | 53.0 |
| 6 * | −27.968 | 0.10 | — | — |
| 7 | 10.459 | 1.81 | 1.77250 | 49.6 |
| 8 | −8.196 | 1.13 | 1.80610 | 33.3 |
| 9 | 4.135 | 5.72-11.69-20.48 | — | — |
| 10 * | 35.035 | 2.40 | 1.68800 | 55.8 |
| 11 | −13.762 | 0.90 | 1.67270 | 32.1 |
| 12 | −21.525 | 2.92-2.24-1.30 | — | — |
| 13 | ∞ | 0.90 | 1.51633 | 64.1 |
| 14 | ∞ | 0.51 | — | — |
| 15 | ∞ | 0.50 | 1.51633 | 64.1 |
| 16 | ∞ | — | — | — |

The symbol * designates the aspherical surface which is rotationally symmetrical with respect to the optical axis.

Aspherical surface data (the aspherical surface coefficients not indicated are zero (0.00)):

| Surf. No. | K | A4 | A6 | A8 |
|---|---|---|---|---|
| 3 | 0.00 | $-0.42450 \times 10^{-4}$ | $-0.10367 \times 10^{-6}$ | $0.64030 \times 10^{-7}$ |
| 4 | 0.00 | $-0.18928 \times 10^{-3}$ | $-0.97631 \times 10^{-7}$ | $0.42668 \times 10^{-7}$ |
| 5 | 0.00 | $-0.40392 \times 10^{-3}$ | $0.70682 \times 10^{-5}$ | $-0.82483 \times 10^{-6}$ |
| 6 | 0.00 | $0.93358 \times 10^{-4}$ | $0.98647 \times 10^{-5}$ | $-0.78819 \times 10^{-6}$ |
| 10 | 0.00 | $-0.96521 \times 10^{-4}$ | $0.32744 \times 10^{-5}$ | $-0.52019 \times 10^{-7}$ |

| Surf. No. | A10 |
|---|---|
| 3 | $0.70446 \times 10^{-9}$ |
| 4 | $0.31779 \times 10^{-9}$ |

Embodiment 3

FIG. 9 is the lens arrangement of the zoom lens system, at the short focal length extremity, according to the third embodiment of the present invention. FIGS. 10A through 10D show aberrations occurred, at the short focal length extremity, in the lens arrangement shown in FIG. 9. FIGS. 11A through 11D show aberrations occurred, at an intermediate focal length, in the lens arrangement shown in FIG. 9. FIGS. 12A through 12D show aberrations occurred, at the long focal length extremity, in the lens arrangement shown in FIG. 9.

Table 3 shows the numerical data of the third embodiment.

The negative first lens group 10 includes a biconcave negative lens element, and a biconvex positive lens element, in this order from the object.

The remaining lens arrangement of the third embodiment is the same as that of the second embodiment.

The diaphragm S is provided 0.60 in front of the positive second lens group 20 (surface No. 5).

TABLE 3

F = 1:2.9-3.9-5.4
f = 8.12-13.70-23.02
W = 31.9-19.3-11.7
fB = 0.59-0.59-0.59

| Surf. No. | r | d | Nd | ν |
|---|---|---|---|---|
| 1 | −730.050 | 0.70 | 1.88300 | 40.8 |
| 2 | 8.246 | 2.00 | — | — |
| 3 * | 19.896 | 1.85 | 1.83291 | 24.1 |
| 4 * | −197.743 | 15.56-7.47-2.39 | — | — |
| 5 * | 6.670 | 1.85 | 1.58636 | 60.9 |
| 6 * | −22.738 | 0.10 | — | — |
| 7 | 8.909 | 1.66 | 1.77250 | 49.6 |
| 8 | −14.324 | 1.44 | 1.80610 | 33.3 |
| 9 | 4.142 | 5.52-11.76-20.48 | — | — |
| 10 * | 35.862 | 2.40 | 1.68800 | 55.8 |
| 11 | −13.998 | 0.90 | 1.67270 | 32.1 |
| 12 | −22.118 | 3.09-2.20-1.31 | — | — |
| 13 | ∞ | 0.90 | 1.51633 | 64.1 |
| 14 | ∞ | 0.51 | — | — |
| 15 | ∞ | 0.50 | 1.51633 | 64.1 |
| 16 | ∞ | — | — | — |

The symbol * designates the aspherical surface which is rotationally symmetrical with respect to the optical axis.

Aspherical surface data (the aspherical surface coefficients not indicated are zero (0.00)):

| Surf. No. | K | A4 | A6 | A8 |
|---|---|---|---|---|
| 3 | 0.00 | $-0.31458 \times 10^{-4}$ | $0.20430 \times 10^{-6}$ | $0.61933 \times 10^{-7}$ |
| 4 | 0.00 | $-0.18095 \times 10^{-3}$ | $-0.67584 \times 10^{-8}$ | $0.39165 \times 10^{-7}$ |
| 5 | 0.00 | $-0.41348 \times 10^{-3}$ | $0.78463 \times 10^{-5}$ | $-0.95203 \times 10^{-6}$ |
| 6 | 0.00 | $0.11547 \times 10^{-3}$ | $0.76100 \times 10^{-5}$ | $-0.67718 \times 10^{-6}$ |
| 10 | 0.00 | $-0.10940 \times 10^{-3}$ | $0.43541 \times 10^{-5}$ | $-0.76808 \times 10^{-7}$ |

| Surf. No. | A10 |
|---|---|
| 3 | $0.49275 \times 10^{-9}$ |
| 4 | $0.97421 \times 10^{-10}$ |

Embodiment 4

FIG. 13 is the lens arrangement of the zoom lens system, at the short focal length extremity, according to the fourth embodiment of the present invention. FIGS. 14A through 14D show aberrations occurred, at the short focal length extremity, in the lens arrangement shown in FIG. 13. FIGS. 15A through 15D show aberrations occurred, at an intermediate focal length, in the lens arrangement shown in FIG. 13. FIGS. 16A through 16D show aberrations occurred, at the long focal length extremity, in the lens arrangement shown in FIG. 13.

Table 4 shows the numerical data of the fourth embodiment.

The basic lens arrangement of the fourth embodiment is the same as that of the second embodiment.

The diaphragm S is provided 0.60 in front of the positive second lens group 20 (surface No. 5).

TABLE 4

F = 1:2.9-3.8-5.5
f = 8.10-13.70-23.15
W = 31.9-19.4-11.8
fB = 0.59-0.59-0.59

| Surf. No. | r | d | Nd | ν |
|---|---|---|---|---|
| 1 | 1290.007 | 0.70 | 1.88300 | 40.8 |
| 2 | 8.454 | 2.00 | — | — |
| 3 * | 19.527 | 1.85 | 1.83291 | 24.1 |
| 4 * | −1000.000 | 15.88-7.54-2.40 | — | — |
| 5 * | 6.416 | 1.85 | 1.58636 | 60.9 |
| 6 * | −24.239 | 0.10 | — | — |
| 7 | 8.522 | 1.60 | 1.77250 | 49.6 |
| 8 | −16.422 | 1.50 | 1.80610 | 33.3 |
| 9 | 3.905 | 4.99-10.93-19.50 | — | — |
| 10 * | 47.492 | 2.40 | 1.68800 | 55.8 |
| 11 | −12.987 | 0.90 | 1.67270 | 32.1 |
| 12 | −19.802 | 3.13-2.30-1.30 | — | — |
| 13 | ∞ | 0.90 | 1.51633 | 64.1 |
| 14 | ∞ | 0.51 | — | — |
| 15 | ∞ | 0.50 | 1.51633 | 64.1 |
| 16 | ∞ | — | — | — |

The symbol * designates the aspherical surface which is rotationally symmetrical with respect to the optical axis.

Aspherical surface data (the aspherical surface coefficients not indicated are zero (0.00)):

| Surf. No. | K | A4 | A6 | A8 |
|---|---|---|---|---|
| 3 | 0.00 | $-0.46203 \times 10^{-4}$ | $-0.82348 \times 10^{-6}$ | $0.37448 \times 10^{-7}$ |
| 4 | 0.00 | $-0.18821 \times 10^{-3}$ | $-0.53710 \times 10^{-6}$ | $-0.75388 \times 10^{-9}$ |
| 5 | 0.00 | $-0.45726 \times 10^{-3}$ | $0.32480 \times 10^{-5}$ | $-0.97755 \times 10^{-6}$ |
| 6 | 0.00 | $0.10819 \times 10^{-3}$ | $0.45225 \times 10^{-5}$ | $-0.78139 \times 10^{-6}$ |
| 10 | 0.00 | $-0.50747 \times 10^{-4}$ | $0.30417 \times 10^{-5}$ | $-0.53035 \times 10^{-7}$ |

Embodiment 5

FIG. 17 is the lens arrangement of the zoom lens system, at the short focal length extremity, according to the fifth embodiment of the present invention. FIGS. 18A through 18D show aberrations occurred, at the short focal length extremity, in the lens arrangement shown in FIG. 17. FIGS. 19A through 19D show aberrations occurred, at an intermediate focal length, in the lens arrangement shown in FIG. 17. FIGS. 20A through 20D show aberrations occurred, at the long focal length extremity, in the lens arrangement shown in FIG. 17.

Table 5 shows the numerical data of the fifth embodiment.

The basic lens arrangement of the fifth embodiment is the same as that of the second embodiment.

The diaphragm S is provided 0.60 in front of the positive second lens group 20 (surface No. 5).

TABLE 5

F = 1:2.9–3.8–5.5
f = 8.10–13.70–23.15
W = 31.9–19.4–11.6
fB = 0.59–0.59–0.59

| Surf. No. | r | d | Nd | ν |
|---|---|---|---|---|
| 1 | 231.728 | 0.70 | 1.88300 | 40.8 |
| 2 | 8.402 | 1.95 | — | — |
| 3 * | 19.473 | 1.80 | 1.83291 | 24.1 |
| 4 * | −1000.000 | 15.25–6.89–1.80 | — | — |
| 5 * | 7.083 | 1.75 | 1.58636 | 60.9 |
| 6 * | −35.366 | 0.10 | — | — |
| 7 | 10.431 | 1.75 | 1.83481 | 42.7 |
| 8 | −21.226 | 1.45 | 1.71736 | 29.5 |
| 9 | 4.273 | 5.02–11.55–20.71 | — | — |
| 10 * | 26.565 | 2.30 | 1.68800 | 55.8 |
| 11 | −15.985 | 0.90 | 1.71736 | 29.5 |
| 12 | −26.975 | 3.59–2.64–1.30 | — | — |
| 13 | ∞ | 0.90 | 1.51633 | 64.1 |
| 14 | ∞ | 0.51 | — | — |
| 15 | ∞ | 0.50 | 1.51633 | 64.1 |
| 16 | ∞ | — | — | — |

The symbol * designates the aspherical surface which is rotationally symmetrical with respect to the optical axis.

Aspherical surface data (the aspherical surface coefficients not indicated are zero (0.00)):

| Surf. No. | K | A4 | A6 | A8 |
|---|---|---|---|---|
| 3 | 0.00 | $-0.22121 \times 10^{-4}$ | $-0.36554 \times 10^{-6}$ | $0.11185 \times 10^{-7}$ |
| 4 | 0.00 | $-0.17350 \times 10^{-3}$ | $0.11498 \times 10^{-6}$ | $-0.28944 \times 10^{-7}$ |
| 5 | 0.00 | $-0.32922 \times 10^{-3}$ | $-0.67319 \times 10^{-5}$ | $-0.11958 \times 10^{-6}$ |
| 6 | 0.00 | $0.13319 \times 10^{-3}$ | $-0.67183 \times 10^{-5}$ | $0.49696 \times 10^{-7}$ |
| 10 | 0.00 | $-0.10617 \times 10^{-3}$ | $0.48478 \times 10^{-5}$ | $-0.79654 \times 10^{-7}$ |

Embodiment 6

FIG. 21 is the lens arrangement of the zoom lens system, at the short focal length extremity, according to the sixth embodiment of the present invention. FIGS. 22A through 22D show aberrations occurred, at the short focal length extremity, in the lens arrangement shown in FIG. 21. FIGS. 23A through 23D show aberrations occurred, at an intermediate focal length, in the lens arrangement shown in FIG. 21. FIGS. 24A through 24D show aberrations occurred, at the long focal length extremity, in the lens arrangement shown in FIG. 21.

Table 6 shows the numerical data of the sixth embodiment.

The basic lens arrangement of the sixth embodiment is the same as that of the third embodiment.

The diaphragm S is provided 0.60 in front of the positive second lens group 20 (surface No. 5).

TABLE 6

F = 1:2.9–3.9–5.5
f = 8.10–13.70–23.15
W = 31.1–19.5–11.8
fB = 0.59–0.59–0.59

| Surf. No. | r | d | Nd | ν |
|---|---|---|---|---|
| 1 | -1629.536 | 0.70 | 1.88300 | 40.8 |
| 2 | 8.517 | 1.91 | — | — |
| 3 * | 19.183 | 1.85 | 1.83291 | 24.1 |
| 4 * | –1000.000 | 15.30–7.54–2.31 | — | — |
| 5 * | 6.430 | 1.85 | 1.58636 | 60.9 |
| 6 * | –22.237 | 0.10 | — | — |
| 7 | 9.226 | 1.60 | 1.77250 | 49.6 |
| 8 | –15.584 | 1.65 | 1.80610 | 33.3 |
| 9 | 4.011 | 5.10–11.38–19.78 | — | — |
| 10 * | 32.093 | 2.63 | 1.68800 | 55.8 |
| 11 | –11.803 | 0.80 | 1.68893 | 31.1 |
| 12 | –20.234 | 2.82–1.79–1.20 | — | — |
| 13 | ∞ | 0.90 | 1.51633 | 64.1 |
| 14 | ∞ | 0.51 | — | — |
| 15 | ∞ | 0.50 | 1.51633 | 64.1 |
| 16 | ∞ | — | — | — |

The symbol * designates the aspherical surface which is rotationally symmetrical with respect to the optical axis.

Aspherical surface data (the aspherical surface coefficients not indicated are zero (0.00)):

| Surf. No. | K | A4 | A6 | A8 |
|---|---|---|---|---|
| 3 | 0.00 | $-0.60749 \times 10^{-4}$ | $0.15366 \times 10^{-6}$ | $0.30592 \times 10^{-7}$ |
| 4 | 0.00 | $-0.19570 \times 10^{-3}$ | $0.12614 \times 10^{-6}$ | $-0.44396 \times 10^{-8}$ |
| 5 | 0.00 | $-0.44314 \times 10^{-3}$ | $-0.20962 \times 10^{-5}$ | $-0.41119 \times 10^{-6}$ |
| 6 | 0.00 | $0.14099 \times 10^{-3}$ | $0.97577 \times 10^{-6}$ | $-0.26615 \times 10^{-6}$ |
| 10 | 0.00 | $-0.54077 \times 10^{-4}$ | $0.32290 \times 10^{-5}$ | $-0.54385 \times 10^{-7}$ |

| Surf. No. | A10 |
|---|---|
| 3 | $-0.45172 \times 10^{-10}$ |
| 4 | $0.55213 \times 10^{-10}$ |

In the first through sixth embodiments, the positive third lens group 30 is constituted by the positive lens element and the negative lens element, in this order from the object; however, the positive third lens group 30 with the opposite lens arrangement, i.e., the negative lens element and the positive lens element, in this order from the object, can achieve the effect of the correcting of lateral chromatic aberration to a certain extent.

Here, it should be understood that constituting the positive third lens group 30 as the cemented lens elements is the most significant feature of the present invention. Accordingly, there is some degree of freedom in the design for the negative first lens group 10 and the positive second lens group 20.

The numerical values of each condition for each embodiment are shown in Table 7.

TABLE 7

|  | Embod. 1 | Embod. 2 | Embod. 3 |
|---|---|---|---|
| Condition (1) | 0.23 | 0.25 | 0.25 |
| Condition (2) | 0.00 | 0.10 | 0.11 |
| Condition (3) | 0.77 | 0.71 | 0.71 |
| Condition (4) | 0.35 | 0.41 | 0.40 |
|  | Embod. 4 | Embod. 5 | Embod. 6 |
| Condition (1) | 0.25 | 0.26 | 0.30 |
| Condition (2) | 0.11 | 0.15 | 0.13 |
| Condition (3) | 0.70 | 0.67 | 0.70 |
| Condition (4) | 0.39 | 0.40 | 0.44 |

As can be understood from Table 7, the first through sixth embodiments satisfy conditions (1) through (4). Furthermore, as can be understood from the aberration diagrams, the various aberrations are adequately corrected.

According to the above description, a zoom lens system with a zoom ratio of approximately 3 at the short focal length extremity, and with a half angle-of-view of 32° to 34° thereat, can be achieved. The present invention, in particular, can achieve a zoom lens system which attains high definition while lateral chromatic aberration is adequately corrected. Further, the present invention can provide a zoom lens system in which the thickness of lens groups can be made ultra-slim (miniaturized).

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A zoom lens system comprises a negative first lens group, a positive second lens group and a positive third lens group functioning as a focusing lens group, in this order from an object, wherein upon zooming from the short focal length extremity to the long focal length extremity, the distance between said negative first lens group and said positive second lens group decreases, and the distance between said positive second lens group and said positive third lens group increases;

wherein said positive third lens group comprises cemented lens elements having a positive lens element and a negative lens element arranged in this order from the object; and wherein said zoom lens system satisfies the following condition:

$$0.2 < f_{3-p}/|f_{3-n}| < 0.35$$

wherein $f_{3-p}$ designates the focal length of said positive lens element of said positive third lens group; and $f_{3-n}$ designates the focal length of said negative lens element of said positive third lens group.

2. The zoom lens system according to claim 1, satisfying the following condition:

$$0.0 \leq \log(Z_3)/\log(Z) < 0.2$$

wherein $Z_3$ designates the zoom ratio of said positive third lens group; and $Z$ designates the zoom ratio of the entire the zoom lens system.

3. The zoom lens system according to claim 1, satisfying the following conditions:

$$0.65 < (f_W \times f_T)^{1/2}/|f_{1G}| < 1.1$$

$$0.2 < f_W/f_{3G} < 0.5$$

wherein $f_W$ designates the focal length of the entire the zoom lens system at the short focal length extremity;

$f_T$ designates the focal length of the entire the zoom lens system at the long focal length extremity;

$f_{1G}$ designates the focal length of said negative first lens group; and $f_{3G}$ designates the focal length of said positive third lens group.

* * * * *